US005155786A

United States Patent [19]
Ecker et al.

[11] Patent Number: 5,155,786
[45] Date of Patent: Oct. 13, 1992

[54] APPARATUS AND A METHOD FOR AN OPTICAL FIBER INTERFACE

[75] Inventors: Mario E. Ecker; Lawrence Jacobowitz, both of Poughkeepsie, N.Y.

[73] Assignee: International Business Machines Corporation, Armonk, N.Y.

[21] Appl. No.: 693,996

[22] Filed: Apr. 29, 1991

[51] Int. Cl.[5] ............................ G02B 6/30; H01L 39/02
[52] U.S. Cl. ........................................ 385/94; 385/92; 385/88; 385/89; 385/49; 357/80; 357/81
[58] Field of Search ............... 350/96.11, 96.15, 96.17, 350/96.20, 96.21, 320; 250/227.11; 357/80, 81; 385/88, 89, 91, 92, 94, 130, 131, 49; 156/60, 158

[56] References Cited

U.S. PATENT DOCUMENTS

| | | | |
|---|---|---|---|
| 4,130,343 | 12/1978 | Miller et al. | 385/88 X |
| 4,169,001 | 9/1979 | Kaiser | 156/89 |
| 4,226,281 | 10/1980 | Chu | 165/80 A |
| 4,235,283 | 11/1980 | Gupta | 165/80 C |
| 4,268,113 | 5/1981 | Noel, Jr. | 385/92 |
| 4,296,998 | 10/1981 | Dufft | 385/91 |
| 4,623,220 | 11/1986 | Grabbe et al. | 385/91 |
| 4,647,148 | 3/1987 | Katagiri | 385/94 |
| 4,722,586 | 2/1988 | Dodson et al. | 385/92 |
| 4,730,198 | 3/1988 | Brown et al. | 385/89 |
| 4,732,446 | 3/1988 | Gipson et al. | 385/24 |
| 4,752,109 | 6/1988 | Gordon et al. | 385/93 |
| 4,755,017 | 7/1988 | Kapany | 385/33 |
| 4,844,581 | 7/1989 | Turner | 385/91 |
| 4,865,410 | 9/1989 | Estrada et al. | 385/92 |
| 4,887,876 | 12/1989 | Fricke et al. | 385/53 |
| 4,897,711 | 1/1990 | Blonder et al. | 357/74 |
| 4,959,540 | 9/1990 | Fan et al. | 250/227.12 |
| 5,005,939 | 4/1991 | Avanitakis et al. | 385/53 |
| 5,011,246 | 4/1991 | Corradetti et al. | 385/92 |
| 5,039,194 | 8/1991 | Block et al. | 385/88 |
| 5,101,465 | 3/1992 | Murphy | 385/88 |
| 5,113,466 | 5/1992 | Acarlar et al. | 385/88 |

OTHER PUBLICATIONS

L. Balliet, et al., "Built-In Alignment Circuit for Fiber-Optic Silicon Optical Bench," IBM Technical Disclosure Bulletin, vol. 24, No. 2, pp. 1158–1160 (Jul. 1981).

M. J. Brady, et al., "Self-Aligned Optical Fiber/Laser Structure," IBM Technical Disclosure Bulletin, vol. 26, No. 11, pp. 5993–5995 (Apr. 1984).

L. Commerford, et al., "Selectively Etched Diffraction Gratings in GaAs," Applied Physics Letters, vol. 25, No. 4, pp. 208–210 (Aug. 1974).

Won-Tien Tsang, et al., "Profile and Groove-Depth Control in GaAs Diffraction Gratings Fabricated by Preferential Chemical Etching in $H_2SO_4$–$H_2O_2$–$H_2$ System" Applied Phy. Lets. vol. 28, No. 1, pp. 44–46 (Jan. 1976).

J. D. Crow, et al., "GaAs Laser Array Source Package," Optics Letters, vol. 1, No. 1, pp. 40–42 (Jul. 1977).

E. Bassous, "Fabrication of Novel Three-Dimensional Microstructures by the Anisotropic Etching of (100) and (110) Silicon," IEEE Trans. on Electron Devices, vol. ED-25, No. 10, pp. 1185–1193 (Oct. 1978).

K. E. Bean, "Anistropic Etching of Silicon," IEEE Trans. on Electron Devices, vol. ED-25, No. 10, pp. 1185–1193 (Oct. 1978).

M. Spector, "Design of a Solid State Laser Hybrid Package," pp. 172–174.

D. H. Hartman, et al., "Optical Clock Distribution Using a Mode-Locked Semiconductor Laser Diode System," OFC '91, p. 210 (Feb. 22, 1991).

J. D. Crow, "Optical Interconnects Speed Interprocessor Nets," IEEE, pp. 20–25 (Mar. 1991).

Primary Examiner—Brian Healy
Attorney, Agent, or Firm—Aziz M. Ahsan

[57] ABSTRACT

The present invention relates generally to a new interface and a method for making the same, and more particularly, to an optical fiber interface and a method for making the same. On a substrate having semiconductors, a receiver/transmitter connection is provided to interface with an optical fiber. Integral means for the fiber alignment, support and transit through a sealed environment is also provided. The substrate having the receiver/transmitter secured to it with the optical fiber end, is then enclosed in a housing.

18 Claims, 7 Drawing Sheets

APPARATUS AND A METHOD FOR AN OPTICAL FIBER INTERFACE

FIELD OF THE INVENTION

The present invention relates generally to a new interface and a method for making the same, and more particularly, to an optical fiber interface and a method for making the same. On a substrate having semiconductors, a receiver/transmitter connection is provided to interface with an optical fiber. Integral means for the fiber alignment, support and transit through a sealed environment is also provided. The substrate having the receiver/transmitter secured to it with the optical fiber end, is then enclosed in a housing.

CROSS-REFERENCE

This patent application is related to U.S. patent application Ser. No. 07/693,971, pending, entitled "An Apparatus and a Method for an Electrical Transmission-Line Interface", which was filed concurrently on Apr. 29, 1991, and which is assigned to the same assignee as this patent application, and the disclosure of which is incorporated herein by reference.

BACKGROUND OF THE INVENTION

Optical fiber interconnection for computer communication applications such as clock distribution, memory and interprocessor data bus, matrix or cross-point switches offer a unique set of advantages in system architecture, package design, function, and performance. On the other hand there are some problems associated with this technology.

One of the problems is in the assembly and manufacturability of optical fiber links for interconnection, such as, tolerances on fiber alignment to the semiconductor junctions of the optoelectronic communication devices, viz. laser transmitters and photoreceivers. Arrays of fiber links into fluid-sealed semiconductor chip packages further pose problems in strain-relief at device interfaces, fan-out distribution, integrability, and spatial efficiency. Some of these known problems have been resolved by this invention.

The application of preferential crystallographic etching of V-grooves in silicon with photolithographic accuracy was taught by Crow et al., "GaAs Laser Array Source Package," OPTICS LETTERS, Vol. 1, No. 1, pages 40–42 (July 1977). His work also established the feasibility of achieving the required fiber core alignment tolerances.

U.S. Pat. No. 4,730,198 (Brown, et al.) extends the application of V-groove fiber mounting techniques, which were compatible for electrical and optical connections.

Optimizing emitter (LED or laser diode) placement relative to a fiber-optic silicon V-groove was treated by Balliet et al., in IBM Technical Disclosure Bulletin, Vol. 24, No. 2, pages 1158–1160 (July 1981), by balancing the outputs of a pair of junction diodes integrated on the undersides of the V-groove.

Methodology for preferential chemical etching of GaAs is given in Commerford and Zory, "Selectively Etched Diffraction Gratings in GaAs," APPLIED PHYSICS LETTERS, Vol. 25, No. 4, pages 208–210 (Aug, 15, 1974), and Tsang and Wang, "Profile and Groove-Depth Control in GaAs Diffraction Gratings Fabricated by Preferential Chemical Etching in $H_2SO_4$-$H_2O_2$-$H_2O$ System" APPLIED PHYSICS LETTERS, Vol. 28, No. 1, pages 44–46 (January 1976).

Extension of fiber V-groove structure to GaAs substrates with self-aligned monolithically integrated GaAlAs laser was shown by Brady et al., in IBM Technical Disclosure Bulletin, Vol. 26, No. 11, pages 5993–5995 (April 1984) to provide submicron photolithographic alignment tolerances.

Thus, it is clearly recognized that either silicon or gallium arsenide V-grooves may be used.

In U.S. Pat. No. 4,732,446, (Gipson et al.) optical fibers were embedded within the body of a printed circuit board and interfaced with discrete, lensed and beam-split chip carriers to create a simultaneous optical bus and electrical data network. Multiple printed circuit board layers, separated by aluminum heat sink plates, could be stacked and a card edge connector could form the interface to incoming data cables. Because of the multiplicity of chip carrier interfaces the modal noise and optical power losses associated with this structure can be expected to significantly exceed those of the present invention.

Conventional approaches for electrical connection include the wire bond lead or "TO-# Can" package typified in U.S. Pat. No. 4,647,148 (Katagiri) and, "tab connection" typified in U.S. Pat. No. 4,722,586, (Dodson et al.).

The present invention teaches compatible designs for interfacing external lightwave conduits into a fluid-sealed, temperature-controlled module, and, direct distribution within the module to selectable semiconductor chip positions, in either simplex or duplex fiber modes, for either bidirectional or unidirectional lightwave signals. The present invention further teaches surface connection, avoiding passage through module layers or cooling structures, and, eliminating auxiliary arrays of photonic transmitters and receivers at the module-cable edge interface, as disclosed in U.S. Pat. 4,169,001, (Kaiser).

The use of controlled collapse chip connection (C-4) with lithographically precise solder ball arrays for positioning and electrically connecting the optical pedestal to the substrate having semiconductors further distinguishes the present invention.

In the present invention, the optical pedestal and C-4 provides an integrated optical subassembly and alignment means, assuring thermal coefficient of expansion match to the substrate, optimum impedance, spatial efficiency, and reliability. The option for direct C-4 attachment to the substrate is provided for in alternate embodiments.

Further mechanical design distinctions of the present invention include the Thermal Conduction Module (TCM) - fiber optic penetration assembly, fiber guide structure, optical fiber strain-relief, optical pedestal assembly, and separability of the upper and lower half-planes of the TCM, primarily for test and repairs.

OBJECTS AND SUMMARY OF THE INVENTION

An object of this invention is to provide one or more optical fiber links into a TCM.

Another object of this invention is to remove a decoupling capacitor and utilize its space for an optical pedestal.

Another object of this invention is to provide means in a TCM to guide and align the optical fibers to the optical pedestal.

Still another object of this invention is to provide means for strain-relief of the optical fiber connection.

Yet another object of this invention is to provide optoelectronic conversion at the substrate.

Still another object of this invention is to communicate with semiconductor chips on a multilayered substrate using optical fibers through a TCM.

Still another object of this invention is to provide a fluid tight seal for the optical fiber that is compatible with the present TCM seal system.

Yet another object of this invention provides for separability in the lightwave signal path for repairs or test.

Still another object of this invention is to have the substrate with the chip and the optical pedestal secured to a portion of the TCM, so that individual portions of the TCM can be independently separated for repairs, test, or upgrade.

Yet another object of this invention is to maintain compatibility with the TCM elements.

Still yet another object of this invention is to provide means for:

a) penetrating the controlled environment of the TCM (Thermal Conduction Module) with one or more optical fibers;

b) aligning and securing the optical fiber through a guide groove;

c) location and alignment of the optical fiber ends to receiver, transmitter, or both;

d) mounting of receiver and/or transmitter devices on the substrate of the TCM; and, e) effecting a separable interface between the fiber and the receiver or transmitter devices.

One aspect of this invention discloses an apparatus for optical fiber interface comprising:

a) a substrate, b) at least one optical receiver on at least one surface of the substrate, c) at least a portion of at least one optical fiber optically communicating with the at least one optical receiver, d) a housing protecting the at least one optical receiver and the substrate, and e) means in the housing for communicating an optical signal through the housing to the at least one optical receiver via the at least one optical fiber.

In another aspect this invention discloses an apparatus for optical fiber interface comprising:

a) a substrate, b) at least one optical receiver on at least one surface of the substrate, c) at least one optical fiber, d) means for guiding the at least one optical fiber to the site of the at least one optical receiver, e) means for aligning and securing the at least one optical fiber to the at least one optical receiver, f) a housing protecting the at least one optical receiver and the substrate, and g) means in the housing for communicating an optical signal through the housing to the at least one optical receiver via said at least one optical fiber.

Still another aspect of this invention discloses a method for providing an optical fiber interface comprising:

a) securing at least one optical receiver on at least one surface of a substrate, b) securing at least one optical fiber to the at least one optical receiver, c) providing a housing to protect the at least one optical receiver and the substrate, and d) providing means in the housing for communicating an optical signal through the housing to the at least one optical receiver via the at least one optical fiber.

Yet another aspect of this invention discloses a method for providing an optical fiber interface comprising:

a) securing at least one optical receiver on at least one surface of a substrate, b) providing means for guiding at least one optical fiber to the site of the at least one optical receiver, c) providing means for aligning and securing the at least one optical fiber to the at least one optical receiver, d) providing a housing to protect the at least receiver and the substrate, and e) providing means in the housing for communicating an optical signal through the housing to the at least one optical receiver via the at least one optical fiber.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

The novel apparatus and method for the optical fiber interface of this invention is comprised of many aspects. The primary aspect of this invention is the utilization of the substrate surface for optoelectronic communication with little or no effect to other electronic devices that may be on the substrate. Similarly, the invention allows for the modification of the cooling configuration of a TCM with little or no impact to the cooling capabilities of the TCM. These and other unique features of this invention are discussed later in this section.

An electronic device as used herein could include passive circuit elements, such as resistors, capacitors, and inductors, or semiconductor devices, and associated circuitry, such as diodes, transistors, logic circuits, to name a few.

Figure 1:
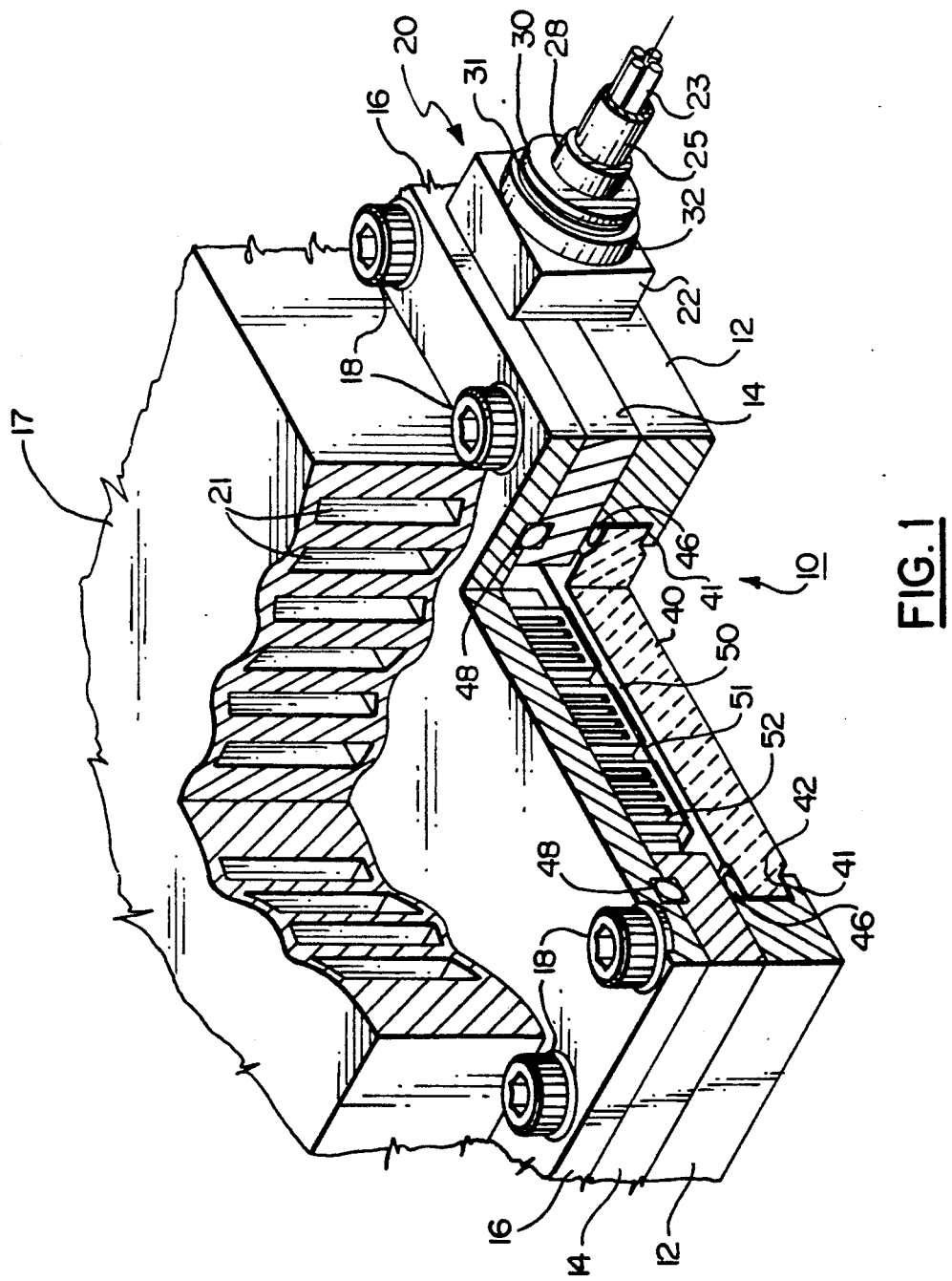
FIG. 1 is a cut-away perspective view of an optical fiber mounting assembly of this invention interfacing with a TCM.

Illustrated in FIG. 1, is a Thermal Conduction Module or TCM 10, comprising a lower frame 12, an upper frame 16, sandwiching a seal frame 14, which has been modified. The lower frame 12, seal frame 14, and upper frame or hat 16, are held together by securing means, such as bolts 18. Usually a cold plate 17, having a number of coolant channels 21, is secured to the upper surface of the upper frame 16, by means well known in the art. A substrate 40, having stepped edge 42, and having semiconductor chips 50, thereon, is secured between the ledge 41, of the lower frame 12, and the extension of seal frame 14, with a gasket 46, therebetween. It is customary to have heat exchange elements 52, such as the High Conduction Cooling (HCC) elements as disclosed in U.S. Ser. No. 07/198,962 now U.S. Pat. No. 5,052,481, (Horvath, et al.), to transfer the heat generated by the chip 50, to the upper frame or hat 16. For the purposes of illustration only, the upper frame or hat 16, is discussed in conjunction with heat exchange element 52, or HCC 52, but the upper frame could have any type of a heat exchange element or cooling device or structure, for example, the upper frame 16, could be similar to the one as dislosed in U.S. Pat. No. 4,226,281, or the one disclosed in U.S. Pat. No. 4,235,283. Of course, in any situation the upper frame 16 would have to be modified to accommodate a guide or a retainer like element. A retainer 51, holds the heat exchange elements 52, in place. As discussed later in this section, this retainer 51, is also used to provide the guide grooves and securing means for an optical fiber 23. In cooling devices or structures where there is no retainer 51, the cooling device or structure could be easily modified by a person skilled in the art to provide means for guiding and securing the optical fiber 23, from the exterior of the TCM 10, to an optoelectronic device on the substrate 40. A fluid tight seal for the chips 50, that are on the substrate 40, may be achieved by means of gaskets 46 and 48. An optical fiber mounting assembly 20, provides the interface between the multi-fiber optical cable 25, and the TCM 10. Face plate 22, keeper 32, wave washer 31, retainer 30, and shoulder 28, are various components of the optical fiber mounting assembly 20, that normally protrude out of the TCM 10.

The optical fiber mounting assembly 20, may be located between any adjacent pair of bolts 18, along the sides of the TCM 10. Therefore, any side of the TCM 10, may then accommodate (N−1) optical fiber mounting assemblies 20, where N=number of bolts along the given side of the TCM 10. Each optical fiber mounting assembly 20, can have a multi-fiber optical cable 25, having one or more optical fibers 23. Each optical fiber 23, typically has a core of a first refractive index material with a cladding of a second refractive index material and a protective jacket which is typically of a polymeric material.

Figure 2:
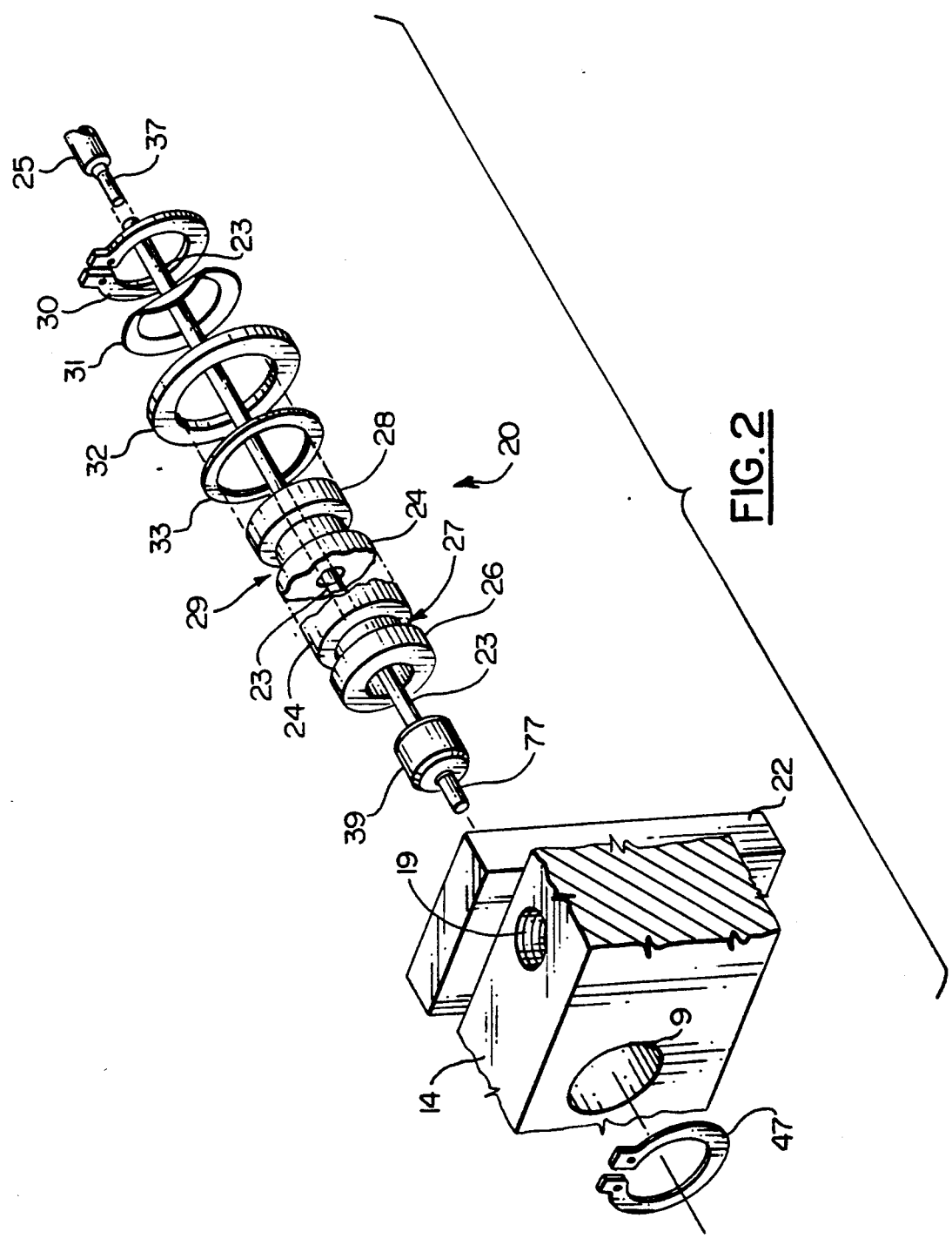
FIG. 2 is an exploded view of the elements of the optical fiber mounting assembly interfacing with the seal frame.

FIG. 2 illustrates an exploded view of the elements of the optical fiber mounting assembly 20, which provides for optical fiber penetration through the side of the seal frame 14. The multi-fiber optical cable 25, is shown with a segment stripped to expose a suitable length of the clad optical fiber 23. A portion of the clad segment of the optical fiber is metallized in two places 37, and 77. The distance between the two metallized locations 37 and 77, is predetermined so as to permit stress relief after assembly to the retainer 51, and the seal frame 14. This metallization at locations 37 and 77, is done primarily to securely attach or bond at least a portion of the optical fiber to a component of the optical fiber mounting assembly 20, and a V-groove in a V-block, respectively. The seal frame 14, has a series of holes 19, to accommodate the bolts 18. A stress relief sleeve 24, has shoulders 26 and 28, at each end, and also radial grooves 27 and 29, to accommodate retaining rings 47 and 30, respectively. The optical fiber mounting assembly 20, can be prepared by feeding the optical fiber 23, through the opening in the stress relief sleeve 24. The metallized segment 37, of the optical fiber 23, is soldered to a ferrule 39. The ferrule 39, in turn, at this point could be soldered to the shoulder 26, of the stress relief sleeve 24. This sub-assembly can now be fed through the hole 9, in the seal frame 14, and the face plate 22. The retainer ring 47, is expanded and then relaxed into the groove 27. The stress relief sleeve 24, is now pulled away or back from the seal frame 14, and O-ring 33, keeper 32, wave washer 31 and retainer ring 30, are slid in place to fully secure the stress relief sleeve 24, to the seal frame 14. This is accomplished by relaxing the retainer ring 30, into the radial groove 29, which compresses and securely holds this assembly in place against the face plate 22. The retainer ring 47, inserted in the radial groove 27, at the other end of the stress relief sleeve 24, securely locks the stress relief sleeve 24, in place on the inside of the seal frame 14.

Figure 3:
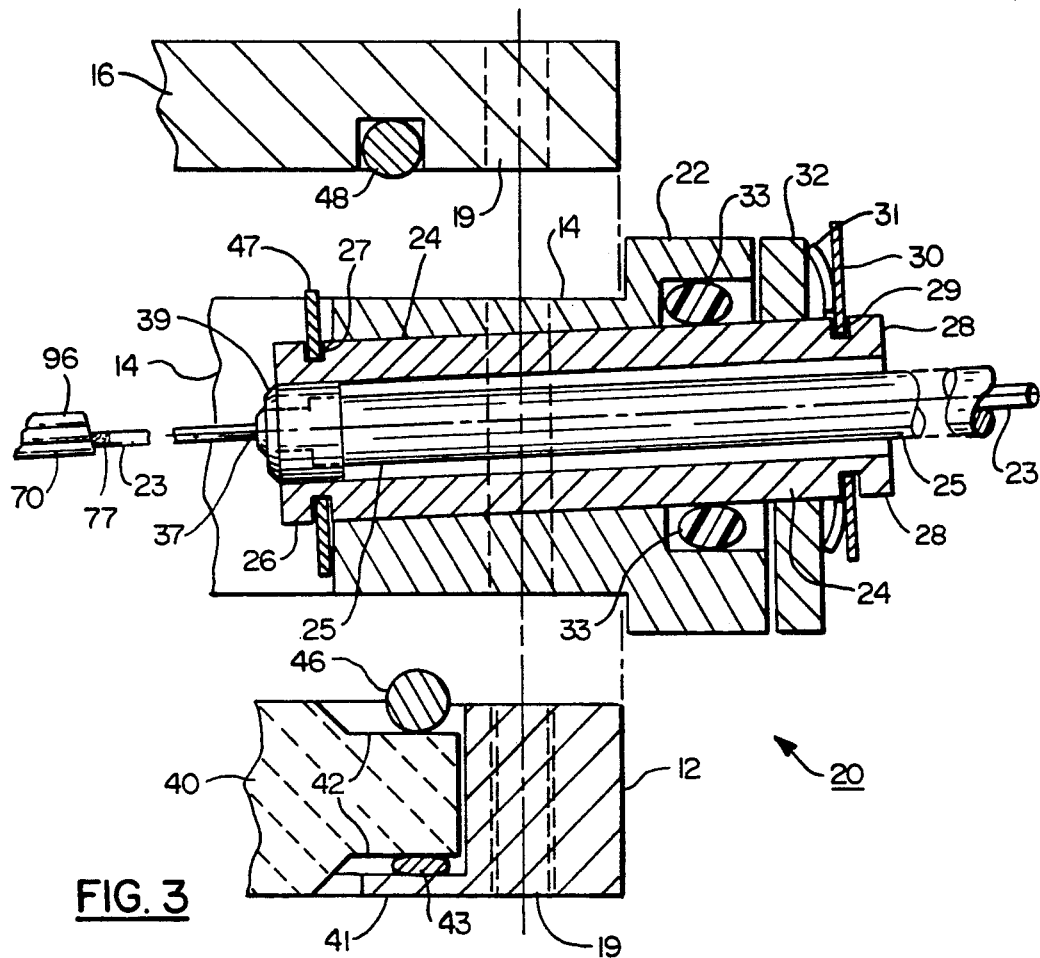
FIG. 3 is an enlarged cross-sectional view of the assembled interfacing between the optical fiber mounting assembly and the TCM elements.

A V-block 70, having channel interlock 96, can now be soldered to the metallized segment 77, that is at the end of the optical fiber 23, as shown in FIG. 3. The external end of the jacketed multi-fiber optical cable 25, may now be stripped and an appropriate fiber optic connector can be attached. FIG. 3, further shows an enlarged cross-sectional view of the assembled optical fiber mounting assembly 20, as part of the seal frame 14, and the upper frame 16, and the lower frame 12. The optical fiber 23, is passed through a stress relief sleeve 24, so that a ferrule 39, may be secured at this time to the metallized region 37, on the clad optical fiber 23, by suitable means, such as brazing, laser welding, or soldering, to name a few. The ferrule 39, is positioned so that it is flush with the face of the shoulder 26, at the end of the stress relief sleeve 24. The ferrule 39, can now be secured by any suitable means, such as brazing, laser welding, soldering, etc. to the end of the stress relief sleeve 24. Similarly, the metallized end 77, of the clad optical fiber 23, can be secured to a preferentially etched, metallized groove in the V-block 70, by suitable means, such as brazing, epoxy bonding, laser welding, or soldering to name a few. The V-block 70 may have one or more V-grooves, as discussed later in this section, that are preferentially etched on its underside depending on whether it is a simplex or duplex application. The V-block 70, with optical fiber 23, secured thereto is placed in a holding tool and ground and polished to produce an appropriate angle for internal reflection of light waves on the end face 98, of the optical fiber/V-block assembly 70. The angled facet of the V-block 70, and the end face of the optical fiber 23, is so devised to reflect optically transmitted light waves downward. The ground and polished end face of the optical fiber/V-block assembly can be metallized as required. The lower frame 12, and the upper frame 16, are sealed with gaskets 46 and 48, respectively. The gasket 33, provides an effective seal for the optical fiber mounting assembly 20. These gaskets 46 and 48, can be an "O-Ring" or a "C-Ring", type gasket to effect sealing when assembled to other elements of the TCM 10, using bolts 18. A pad 43, that is between the ledge 41, and stepped edge 42, provides a cushion for the substrate 40.

Figure 4:
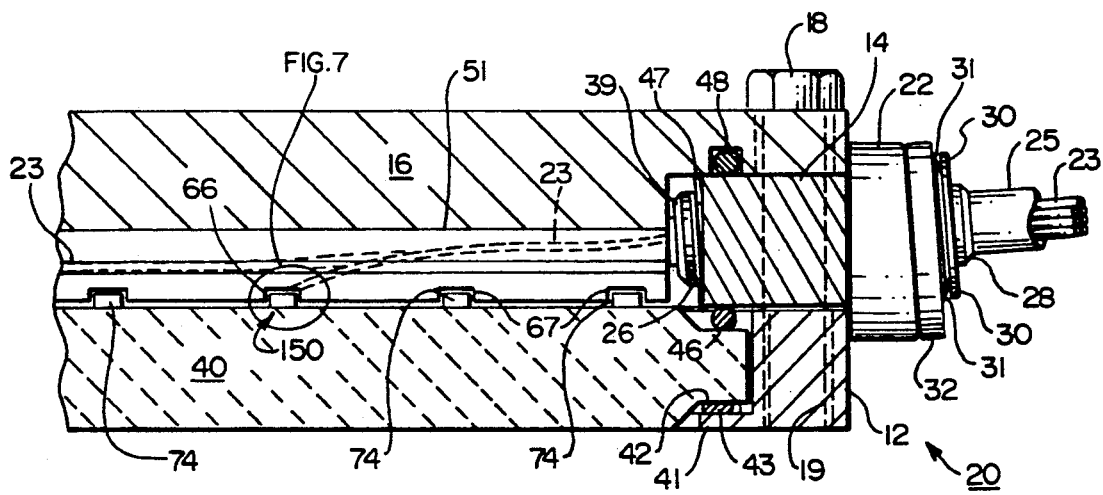
FIG. 4 is a partial cross-sectional view showing the passage of the optical fiber through the optical fiber mounting assembly to the optical fiber pedestal assembly.

FIG. 4, illustrates a partial cross-sectional view showing the passage of the optical fiber 23, through the optical fiber mounting assembly 20, to the optical fiber pedestal assembly 150. This optical fiber pedestal assembly 150, can be placed practically at any location on the substrate 40. These locations could include the sites for semiconductor chip 50, or the sites for decoupling capacitor 74, or between chip edges or piggyback on a semiconductor chip 50, to name a few. The preferred location is to replace a decoupling capacitor 74, with an optical fiber pedestal assembly 150, because by removing a few decoupling capacitors 74, there will be negligible loss in noise immunity, but the removal of a semiconductor chip 50, could have significant loss in circuit capacity. Additionally, this replacement can be done with minimal design change of the substrate wiring. This introduction of these lightwave communication devices provides a significant increase in functional densities and communication data rate.

The thermal expansion differential of the various materials in the TCM will produce strain on the clad fiber 23. This expansivity differential between the optical fiber 23, and the TCM 10, can be accommodated by allowing a portion of the optical fiber 23, to arch inside the housing of the TCM 10, to provide strain relief. This is accomplished by letting the distance between the optical fiber pedestal assembly 150, and the internal optical fiber exit point of the optical fiber mounting assembly 20, be the chordal distance subtended by an arc formed by the optical fiber 23, as shown in FIG. 4. The optical fiber 23, is predisposed to forming this arc, and this can be achieved by having the length of the optical fiber 23, be greater than the chordal distance. In this manner, any differential length can be transformed into a longer or shorter arc length for the optical fiber 23. The arc length variability is translated to flexure stress in the optical fiber 23, which provides strain relief at the fiber V-block 70. The external optical fiber connector should preferably be of a kind that provides strain relief. The retainer 51, has openings 66 and 67, to accommodate the optical fiber pedestal assembly 150, and decoupling capacitor 74, respectively.

Figure 5:
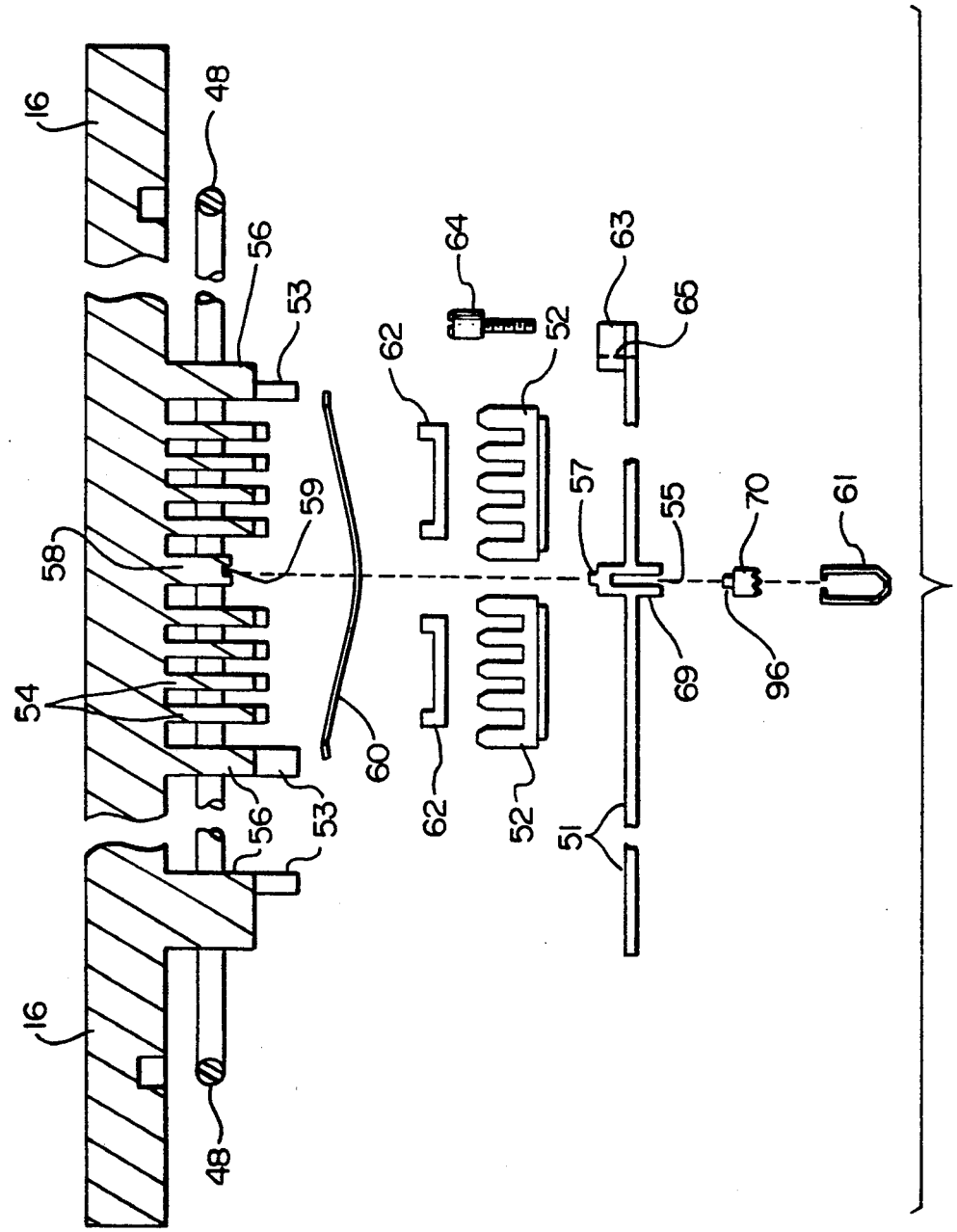
FIG. 5 is an exploded side view showing the retainer having optical fiber guide grooves, and other related elements.

It was also discovered that the existing cooling configuration of part of the upper frame could be modified to allow containment, passage and alignment for the optical fiber and the V-block assembly. This modification allows for maximum utilization of the cooling configuration without impacting the cooling performance. For the purposes of illustration only, the cooling configuration of U.S. Ser. No. 07/198,962 (Horvath, et al.) is shown in FIGS. 1 and 5, and the disclosure of which is incorporated herein by reference, but any existing cooling configuration can be similarly adapted to be used with this invention.

In order to position the optical fibers 23, within the available space in the TCM 10, the retainer 51, and the upper frame 16, are modified. Some of these modifications are shown in FIG. 5. The retainer seat 53, is modified to accommodate the retainer 51. The retainer 51, must also be modified to provide means for securely holding at least a portion of the V-block 70. The upper frame 16, is also modified by shortening one of the retaining guides or large fins 56, to form a stub guide 58. The stub guide 58, has a restraining groove 59, to accommodate the key 57, which is part of the fiber guide 69. The periphery of the upper frame 16, has a groove to accommodate gasket 48. The fins 54, on the upper frame 16, mesh with the fins of the HCC 52, as described in U.S. patent application Ser. No. 07/198,962, (Horvath, et al.). The retainer 51, is a standard retainer that is used in conjunction with the upper frame 16, but now has been modified to have at least one fiber guide 69, having tapered channel 55, and key 57. The retainer 51, also has at least one boss 63, with an opening 65, to accommodate an eccentric pin 64. The HCC spring 62, is normally inserted in the openings in the HCC 52, and this sub-assembly is then placed in the openings in the upper frame 16. The retainer 51, and the retainer spring 60, are then securely attached to the upper frame 16, with the seal frame 14, securely holding this assembly in place. The retainer spring 60, has openings (not shown) to allow the passage of the upper surface of the fiber guide 69, and the key 57, that mates with the restraining groove 59. The result of this modification is to provide a fiber guide channel 69, and still effect the X, Y and Z-axis movement control for the heat exchange element or HCC 52. The clad optical fiber 23, is placed in the tapered channel 55, and the V-block 70, is inserted into the slot provided for it. The tapered ridge 96, on top of the V-block 70, matches the walls of the retainer channel 55, and hence provides self-centering of the V-block 70, with the tapered channel 55. With the V-block 70, so positioned, a spring clip 61, having an aperture so as to permit passage of optical lightwaves is placed around the V-block 70, to capture it. The flat spring 60, that is placed between the retainer 51, and the upper frame 16, maintains engagement between the V-block 70, and the receiver chip 80, during normal operation through the fiber guide 69, and precludes Z-axis motion and compensates for substrate 40, deflections due to module connector actuation, or other forces that might deflect the substrate 40.

Figure 6:
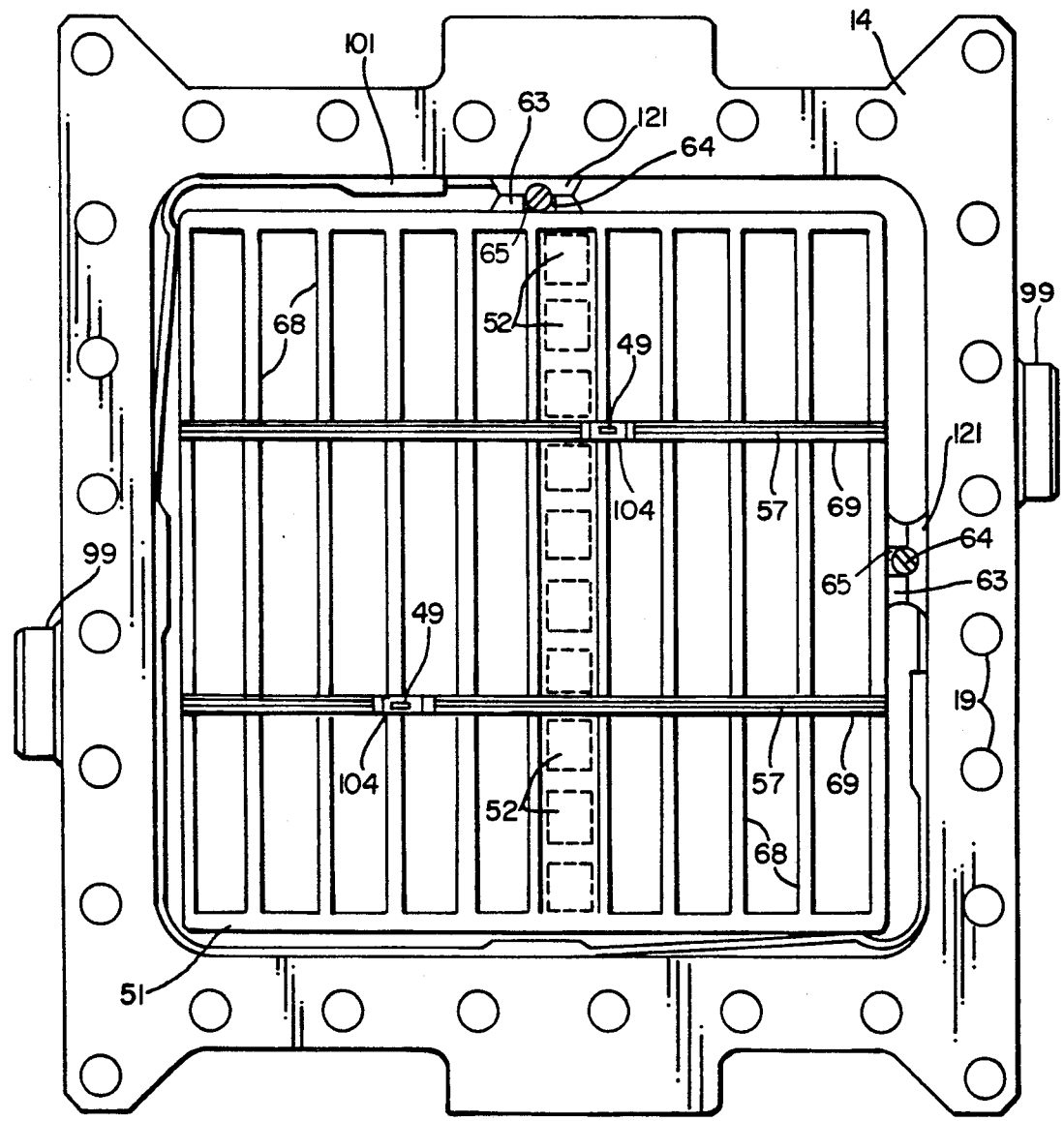
FIG. 6 illustrates a seal frame having modified retainer and alignment means.

The retainer 51, having sector rib 68, to position HCC 52, is assembled through the top of the seal frame 14, by using two of its adjacent edges to compress a bias spring 101, located in the inside wall of the seal frame 14, as illustrated in FIG. 6. Corresponding bosses 121, to bosses 63, on adjacent edges of the retainer 51, are located on the inner sides of the seal frame 14. Bias spring 101, is located on the inner sides of the seal frame 14, to force the retainer 51, against eccentric pins 64, located on the bosses 121. The adjacent edges of retainer 51, are made to compress bias spring 101, so that openings 65, then engage eccentric pins 64. By rotating either eccentric pin 64, the retainer 51, can be precisely positioned in the X and Y axis. An interlock key 49, secures the retainer spring 60, that resides in opening 104. When the various components of the TCM 10, such as lower frame 12, seal frame 14, upper frame 16, optical fiber mounting assembly 20, are assembled, care should be taken that these components provide a fluid tight seal, as the electrooptic components and other electronic devices on substrate 40, must be protected from outside environmental elements. Also, in some cases, the TCM 10, may contain a fluidic medium that acts as the cooling or heat transfer medium for the various electrical and optical components that are on the substrate 40. The stress relief sleeve 24, can also be modified to accommodate any number of optical fiber connectors. One such connector is shown as optical fiber connector 99. Use of such an optical fiber connector 99, would make the TCM 10, modular or be plug-compatible.

Figure 7:
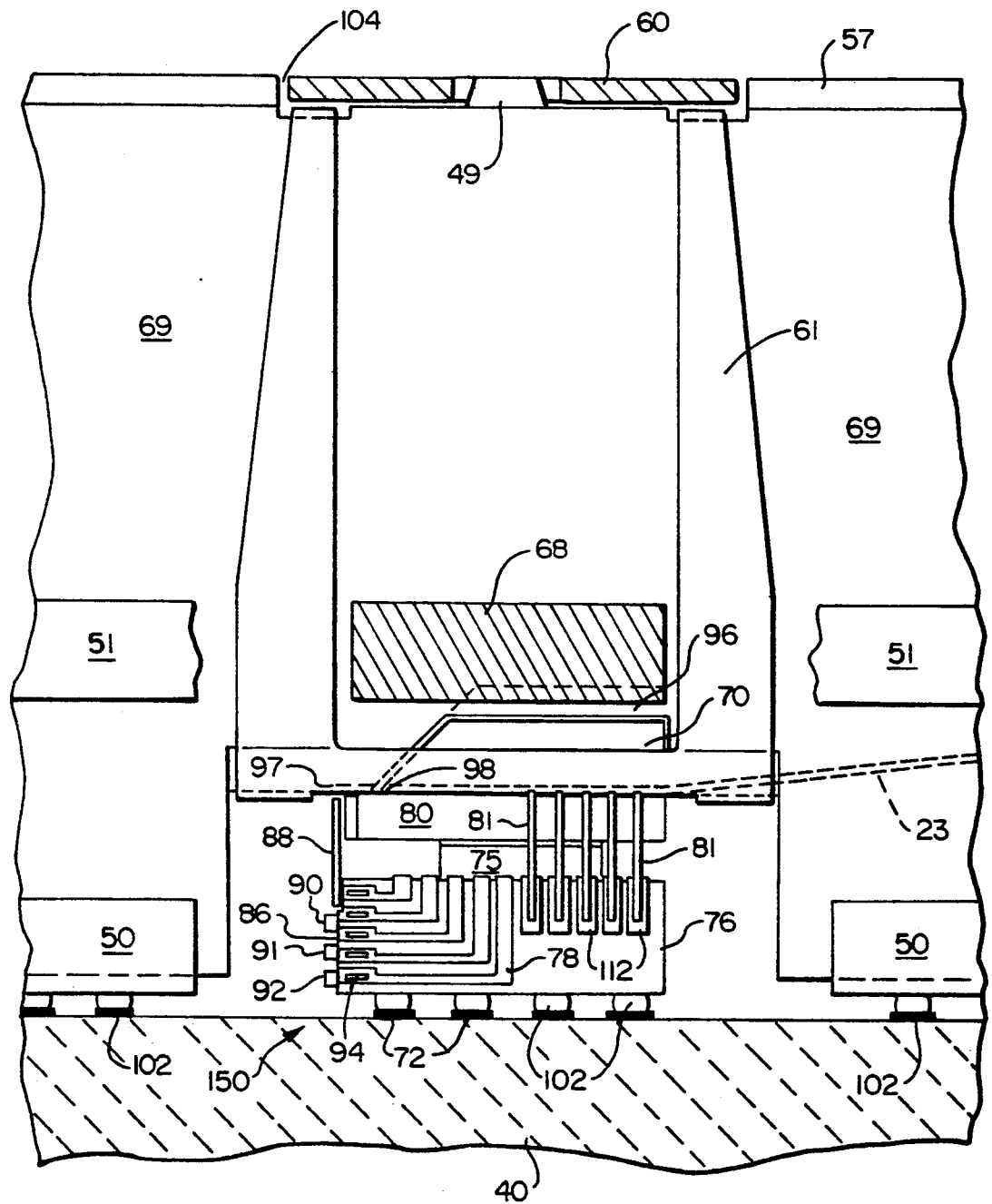
FIG. 7 is an enlarged view of the optical pedestal assembly on a substrate with the partial guide elements.

FIG. 7 is an enlarged view of the optical pedestal assembly 150, with the partial guide elements positioned on the substrate 40. The channel interlock 96, on the V-block 70, is inserted in a precisely located slot in the guide channel 69, and retained by a spring clip 61. The spring clip 61, has an aperture on its underside to permit free passage of light wave transmission from or to the angled optical fiber ends 97 and 98, to the receiver chip 80, and the coupling lens 88. The optical input/output can further be processed through a laser chip 90, laser driver 91, and the function generator chip 92. A stand-off 75, electrically isolates the receiver chip 80, from the electrical surface contacts on the optical pedestal 76. Tabs 81, contact the receiver chip 80, to the optical pedestal 76, through contact pads 112. Similarly, printed circuit lines 78, electrically connect the optical pedestal 76, to the optical transmitter carrier 86, through tabs 94. The substrate 40, has solder pads 72, for mating with the solder balls 102, on the bottom of chip 50, or the optical fiber pedestal assembly 150, or the decoupling capacitor 74, not shown. The sector rib 68, is used to position the heat exchange elements 52, not shown. The retainer 51, has a key 57, and an optical fiber guide 69, that contains the tapered channel 55, as shown and discussed in FIG. 5. The key 57, has openings 104, to accommodate spring clip 61, and the flat retainer spring 60, using the interlock key 49.

Figure 8:
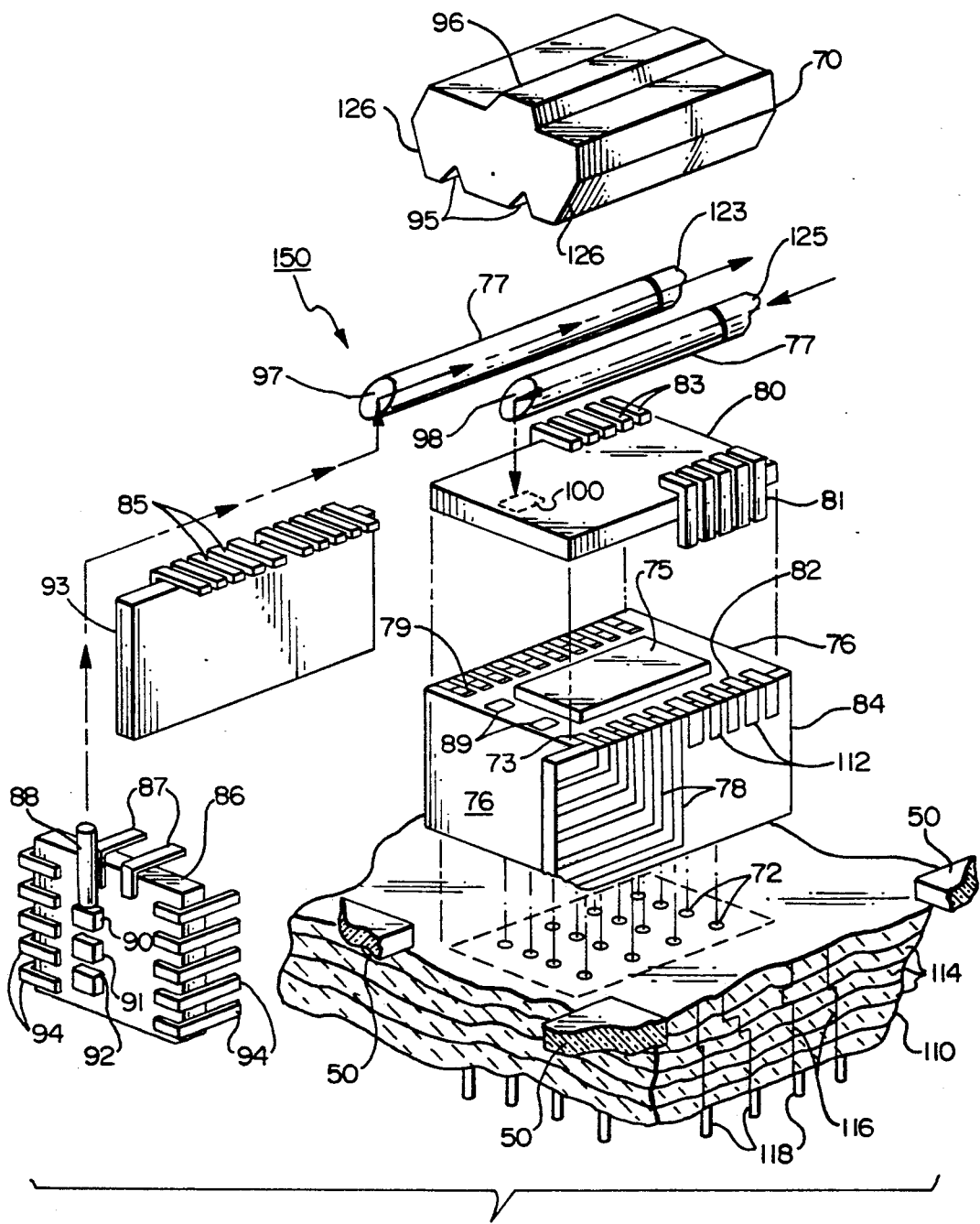
FIG. 8 is a perspective exploded view of the optical fiber pedestal assembly and related elements.

The optical fiber pedestal assembly 150, is shown bonded to a substrate 40, in FIG. 7, and is discussed in detail in FIG. 8. The substrate 40, can be a multilayered ceramic (MLC) substrate 110. The substrates 40 or 110, normally have solder pads 72, to mate with the solder balls 102, that are on the underside of the chip 50, or the optical pedestal 76, or the decoupling capacitor 74 (not shown).

FIG. 8, shows an exploded view of the optical fiber pedestal assembly 150, and its related elements. The optical pedestal 76, is preferably positioned along the fiber guide channel axis and between any pair of bolts 18, as discussed earlier. As discussed herein optical fiber 125, couples to a detector 100, on the receiver chip 80, and optical fiber 123, communicates with the laser chip 90, through the coupling lens 88. However, a single optical fiber can be adapted for bi-directional optical communication with the receiver chip 80, and the transmitter carrier 86. The optical pedestal 76, is a multilayer ceramic having a pattern of solder balls 102 on the underside for effecting a controlled collapse bond to a similar array of solder pads 72, which is shown configured on the surface of a multilayered ceramic substrate 110. The MLC optical pedestal 76, provides for electrical connection between the optical pedestal 76, and the MLC substrate 110, and is in optical contact with at least a portion of the optical fibers 23 or 125, through the receiver chip 80. The multilayered substrate 110, typically has pins 118, on the underside, which are electrically connected to metal layers 114, by means of metal filled vias 116. This electrical path provides electrical connection to external circuitry and power distribution.

Printed circuit member 84, is bonded to one side of the optical pedestal 76, to provide contact pads 112 for attaching tabs 81. Similarly, the printed circuit member 93, having tabs 85, is attached to the other side of the optical pedestal 76, to provide the pads to mount tabs 83. Tabs 82, along the upper edge of printed circuit member 84, are formed so as to allow bonding to the pads 73, on the optical pedestal 76. A projection or stand-off 75, is preferably located centrally on the top surface of the optical pedestal 76, to which the receiver chip 80, is bonded so as to preclude contact of the receiver chip 80 and the tabs 82 and 85.

The V-block 70, could have a plurality of V-grooves 95, to accommodate a plurality of optical fibers 23, 123 or 125, as well as provide for V-block retention. The V-grooves 95, etched in the V-block 70, may be defined lithographically in either GaAs or Si. The V-grooves 95, that are used to accommodate one end of the optical fiber 23, can be, for example, etched in (100) silicon with either ethylenediamene or KOH solutions. See for example, E. Bassous, "Fabrication of Novel Three-Dimensional Microstructures by the Anisotropic Etching of (100) and (110) Silicon" IEEE Transactions on Electron Devices, Vol. ED25, No. 10, pages 1178–1185 (October 1978). Because of the nature of anisotropic etching, a definition of the width of the channel also defines its depth by simple geometry, in order to place an optical fiber 23, or 123 and 125, into V-grooves 95, so that the optical fiber 23, or 123 and 125, are tangent to the V-groove walls at points enabling the optical fiber axis to be coplanar with the surface of the silicon. With accurate control of temperature and time, etched V-grooves can be defined with great accuracy. The material for the V-block 70, is preferably selected from a group consisting of germanium, silicon, binary alloys of gallium or indium with arsenic or phosphorus, and ternary alloys of aluminum with gallium or indium with arsenic or phosphorus. Typical materials are silicon, germanium, gallium arsenide, indium phosphide, etc.

At least one of the V-blocks 70, could have means to align and secure it to a complementary aligning and securing means in the receiver chip 80. This could be done very easily by either having a male/female on the V-block 70, that mates with a female/male portion on the receiver chip 80. Another way of providing this alignment could be etching at least one dummy V-groove in the receiver chip 80, and securing at least one cylindrical key, such as a dummy optical fiber, into one of the V-grooves 95, and then aligning the V-block 70, with the cylindrical key such that the cylindrical key or dummy optical fiber gets secured into one of the dummy V-grooves on the receiver chip 80. Additionally, an X-Y alignment lock can be created by preferentially etching a second V-groove that is preferably transverse to the first V-groove into the receiver chip 80, and thereby an X-Y alignment lock can be formed. In this case the V-block 70, will have to have at least two cylindrical keys, so that each one goes into each of the corresponding etched grooves.

The optical fiber 23, or 123 and 125, are secured into the V-groove 95, by any suitable means, such as brazing, laser welding, soldering, epoxy bonding, etc. The outside surfaces of both the optical fiber 23, or 123 and 125, and the V-groove 95, are prepared for further joining, such as by metallizing with successive layers of appropriate metals which are vacuum deposited. If solder is to be used, then the optical fiber 23, or 123 and 125, are bonded into the V-grooves 95, with eutectic solder. The solder can be applied either by vacuum deposition or by use of solder preforms. It is important to keep the optical fiber 23, or 123 and 125, in the V-groove 95, during the bonding or securing operation. This can be done with a simple jig wherein a plate is pushed against the optical fiber 23, or 123 and 125, to keep it in the V-groove 95.

To permit the light cone to exit the optical fibers 23, or 123 and 125, at a cone axis of 90-degrees to the optical fiber axis, the end of the optical fibers 23, 123 and 125, may be cut at an angle (beveled). This can be accomplished by a simple grinding operation with the optical fiber bonded to the V-block 70. The resulting optical fiber end face is then metallized for reflection, or the bevel can be made so as to cause total internal reflection where no metallization is required. One can also use a beam-splitter for bi-directional lightwave transmission.

The V-blocks 70, can be batch fabricated. This can be done by configuring V-blocks 70, on a silicon or gallium arsenide wafer as a cell array. Each cell boundary is defined by etching a V-groove contiguous with the desired four sides of the V-block 70. The desired number of V-grooves 95, for attaching the ends of optical fibers 123 and 125, are etched simultaneously with the V-groove defining the cell boundary. Using conventional photolithographic processing, the wafer is photoresist coated, exposed through a blockout mask, developed, metallized, and, finally, stripped to selectively open suitable optical fiber bonding surfaces in the V-grooves of each cell. The V-blocks 70, are now diced out of the wafer in strips by cleaving along the cell boundaries that had been etched earlier and these boundaries are now transverse to the strip of the optical fiber V-grooves 95. The metallized fiber ends 123 or 125, are bonded to the appropriate V-grooves of each cell in a strip. Each strip is then fixtured and ground to produce angled fiber end faces 97 or 98. These strips that are in a bar form are then finally diced into individual V-blocks 70, by further cleaving along the etched cell boundaries parallel to the V-grooves 95.

Cleaving along the parallel cell boundaries results in etched, tapered V-block sidewalls 126, as shown in FIG. 8. These tapered V-block sidewalls 126, are used to retain the V-block 70, in the slot of the optical fiber guide 69, with spring clip 61, shown in FIG. 7. Spring clip 61, should have a matching taper for retaining the V-block 70, so that the fiber can be placed flush with the receiver chip 80. These tapered V-block sidewalls 126, retention means eliminate mechanical interference between spring clip 61, and the receiver chip 80. The ability to flush mount the optical fibers 123, 125 to the receiver chip 80, eliminates the need for a coupling lens.

The optical pedestal 76, is extendible to accommodate an optical transmitter carrier 86, as shown in FIG. 8. A coupling lens 88, such as a GRIN (graded refractive index) lens can be positioned in the V-groove of the optical transmission carrier 86, for alignment to the laser chip 90, located on the optical transmitter carrier 86. As can be seen by the dashed lines in FIG. 8, that a portion of the optical fiber 123, is in optical contact with the optical transmitter 86. The optical transmitter carrier 86, has means for optically communicating the information received from at least one of the electronic devices on the substrate 40 or 110, to one or more of the optical fibers, such as optical fiber 23 or 123. For bi-directional data communication, a single optical fiber 23, with partial-silvered angled endface is mounted in V-groove 95, with the transmitter coupling lens 88, orthogonally aligned to the optical fiber axis. The finished optical pedestal assembly 150, is then reflow-bonded on to the substrate 40 or 110, as, for example, at the vacated corner capacitor 74, position. Electrical wiring from the optical pedestal 76, to the appropriate chips 50, completes the circuit to the optical receive-transmit circuitry.

The optical pedestal 76, may then be simultaneously reflow soldered to the substrate 40 or 110, along with the semiconductor chips 50. After reflow soldering the optical pedestal 76, can be selectively reflowed again in a vacuum aided planarizing and height referencing tool. This operation positions the optical pedestal 76, for optimum alignment with the optical fiber 23, or 123 and 125, mounted in the V-groove 95, in the V-block 70.

The optical pedestal 76, has internal wiring to connect electrical paths through the C4 or solder pads 72, from the multilayer ceramic substrate 110, to peripheral pads 73, 79 and 89, on the optical pedestal 76. Printed circuit members 84 and 93, are bonded to the sides of the optical pedestal 76, as discussed earlier. Tabs 82 and 85, are thermo-compression bonded to the pads 73 and 79, respectively. The receiver chip 80, is then bonded to the projection or the stand-off 75. Optionally, the coupling lens 88, is aligned and bonded to the optical transmitter carrier 86, and this assembly is then bonded to the optical pedestal 76. Tabs 87 and 94, on the optical transmitter carrier 86, can now be thermocompression bonded to the pads 89, and the printed circuit lines 78, respectively, on the optical pedestal 76. Using a vacuum assisted tool the optical pedestal 76, along with the receiver chip 80, and the optical transmitter carrier 86, secured to it, can be reflowed against a 3-point reference that in turn is referenced to a 3-point reference about the perimeter of the MLC substrate 110. During this reflow process, the C4s or solder balls 102, may elongate but at no time, will they be discontinuous. The tool may angularly rotate the optical pedestal 76, to achieve alignment with reference marks etched in the thin films of the wiring pattern on the substrate 110. This alignment is held for a long enough time to allow the solder balls 102, to solidify again.

The seal frame 14, retainer 51, lower frame 12, substrate 110, and gasket 46, are properly assembled and compressed to sealing conditions and are optimally aligned. Similarly, at least a portion of the optical fiber 23 or 125, must be optically aligned with the photodetector 100, on the receiver chip 80, After the optical alignment, the photodetector 100, can be electrically activated. The optical fiber 23, in a simplex case, or optical fibers 123 and 125, in a duplex case, are connected to a test set-up allowing transmission of optical test patterns. By observing the output level of the photodetector 100, the eccentric threaded pins 64, are rotated to laterally position the fiber end face for peak signal output. The substrate 110, can also be laterally adjusted to optimize it for optimum pin/connector alignment and the optical fiber 23, or 123 and 125, can again be realigned for peak signal output.

If the lightwave signal input is used for optical clock distribution, then only one to five optical fibers 23, may be required. For bi-directional data transmission 35 to 40 simplex optical fiber pairs may be used.

Another advantage of this invention is to supply optical lightwave communication or optical signal for clock distribution and/or data-bus applications. Typically an electronic clock distribution system is comprised of a master oscillator from which a clock pulse train is distributed to satellite electronic functions, such as a logic chip on a substrate contained in a TCM. This invention enables the application of laser clock generation and optical fiber distribution in a conventional TCM. Additional advantages of this optical clock distribution system relative to the present-day electronic clocking systems include the following:

a) reduced skew (clock pulse arrival time variation);
b) low noise at high clock frequencies (greater than 100 MHz.
c) increased distance between electrical functions by use of optical fiber;
d) eliminate speed-matching buffers.

If an optical clock were to be utilized such as the one in this invention, a practical implementation would entail the distribution of a clock pulse train to each quadrant of the MLC substrate. Further clock distribution by the electrical nets within each quadrant then synchronizes the logical operations to a machine cycletime for the computer chips.

In the data bus application, high-speed serialized bits of data must be communicated between memory locations or between data storage and logic chips. This invention enables the use of optical fibers to connect to transmitters with suitable encoders, serializer and linkadapter chips. Furthermore, the use of optical fiber allows the use of large bandwidths of data to be communicated between receiver, decoder, deserializer, and clock-recovery chips at other memory or logic chip locations within the computer system complex. The use of optical fiber enables the use of new architectures for coupling many processors and data storage devices together for expanded memory and parallel high-speed operation across optical interconnections between these communication nodes. Other advantages of optical data bus interconnect using optical fiber include bandwidth ability to provide very high I/O through multiplexing in frequency or wavelength, greater transmission distances between I/O devices, greater distance between logic and memory, packaging compactness and light weight relative to copper cables, and compatibility with future optical crosspoint switching and data communication on long-haul telecommunications.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An apparatus for optical fiber interface comprising:
   a) a substrate,
   b) at least one optical receiver on at least one surface of said substrate,
   c) at least a portion of at least one optical fiber optically communicating with said at least one optical receiver,
   d) a housing protecting said at least one optical receiver and said substrate,
   e) means in said housing for communicating an optical signal through said housing to said at least one optical receiver via said at least one optical fiber, and
   f) wherein at least a portion of said optical fiber inside said housing is arced to provide stain relief.

2. An apparatus for optical fiber interface comprising:
   a) a substrate,
   b) at least one optical receiver on at least one surface of said substrate,
   c) at least a portion of at least one optical fiber optically communicating with said at least one optical receiver,
   d) a housing protecting said at least one optical receiver and said substrate,
   e) means in said housing for communicating an optical signal through said housing to said at least one optical receiver via said at least one optical fiber, and
   f) wherein said housing has a retainer, and wherein said retainer has at least one fiber guide having a tapered channel to securely hold a channel interlock of a V-block, and wherein said retainer further having at least one key to mate with a stub guide on the upper frame of said housing.

3. An apparatus for optical fiber interface comprising:
   a) a substrate,
   b) at least one optical receiver on at least one surface of said substrate,
   c) at least a portion of at least one optical fiber optically communicating with said at least one optical receiver,
   d) a housing protecting said at least one optical receiver and said substrate,
   e) means in said housing for communicating an optical signal through said housing to said at least one optical receiver via said at least one optical fiber, and
   f) wherein said substrate further having an optical fiber pedestal assembly comprises of an optical pedestal having secured thereto at least one printed circuit member and at least one receiver chip.

4. The apparatus for optical fiber interface of claim 3, wherein said optical pedestal further having secured thereto an optical transmitter carrier.

5. The apparatus for optical fiber interface of claim 4, wherein said optical transmitter carrier has at least one coupling lens, at least one laser chip and at least one laser driver.

6. The apparatus for optical fiber interface of claim 3, wherein said receiver chip has at least one photodetector.

7. The apparatus for optical fiber interface of claim 6, wherein at least a portion of said optical fiber is optically aligned with said photodetector on said receiver chip.

8. The apparatus for optical fiber interface of claim 3, wherein said optical pedestal is a multilayered electrical interconnect structure.

9. A method for providing an optical fiber interface comprising:
   a) securing at least one optical receiver on at least one surface of a substrate,
   b) securing at least one optical fiber to said at least one optical receiver,
   c) providing a housing to protect said at least one optical receiver and said substrate,
   d) providing means in said housing for communicating an optical signal through said housing to said at least one optical receiver via said at least one optical fiber, and
   e) wherein said housing comprises a lower frame, a seal frame, and an upper frame and wherein each of said frames can be selectively assembled and disassembled.

10. A method for providing an optical fiber interface comprising:

a) securing at least one optical receiver on at least one surface of a substrate,
b) securing at least one optical fiber to said at least one optical receiver,
c) providing a housing to protect said at least one optical receiver and said substrate,
d) providing means in said housing for communicating an optical signal through said housing to said at least one optical receiver via said at least one optical fiber, and
e) wherein at least a portion of said optical fiber inside said housing is arced to provide strain relief.

11. A method for providing an optical fiber interface comprising:
a) securing at least one optical receiver on at least one surface of a substrate,
b) securing at least one optical fiber to said at least one optical receiver,
c) providing a housing to protect said at least one optical receiver and said substrate,
d) providing means in said housing for communicating an optical signal through said housing to said at least one optical receiver via said at least one optical fiber, and
e) wherein said housing has a retainer, and wherein said retainer has at least one fiber guide having a tapered channel to securely hold a channel interlock of a V-block, and wherein said retainer further having at least one key to mate with a stub guide on the upper frame of said housing.

12. A method for providing an optical fiber interface comprising:
a) securing at least one optical receiver on at least one surface of a substrate,
b) securing at least one optical fiber to said at least one optical receiver,
c) providing a housing to protect said at least one optical receiver and said substrate,
d) providing means in said housing for communicating an optical signal through said housing to said at least one optical receiver via said at least one optical fiber, and
e) wherein said substrate further having an optical fiber pedestal assembly comprises of an optical pedestal having secured thereto at least one printed circuit member and at least one receiver chip.

13. The method for providing optical fiber interface of claim 12, wherein said optical pedestal further having secured thereto an optical transmitter carrier.

14. The method for providing optical fiber interface of claim 13, wherein said optical transmitter carrier has at least one coupling lens, at least one laser chip and at least one laser driver.

15. The method for providing optical fiber interface of claim 12, wherein said receiver chip has at least one photodetector.

16. The method for providing optical fiber interface of claim 12, wherein said optical pedestal is a multilayered electrical interconnect structure.

17. The method for providing optical fiber interface of claim 15, wherein at least a portion of said optical fiber is optically aligned with said photodetector on said receiver chip.

18. A method for providing an optical fiber interface comprising:
a) securing at least one optical receiver on at least one surface of a substrate,
b) securing at least one optical fiber to said at least one optical receiver,
c) providing a housing to protect said at least one optical receiver and said substrate,
d) providing means in said housing for communicating an optical signal through said housing to said at least one optical receiver via said at least one optical fiber,
e) wherein a portion of said optical fiber is in optical contact with an optical pedestal, and
f) wherein said optical pedestal is secured and aligned to said substrate by having a plurality of solder balls being secured to the base of said optical pedestal and wherein said solder balls are reflowed against a first 3-point reference that in turn is referenced to a second 3-point reference.

* * * * *